US012782899B2

(12) United States Patent
Kale et al.

(10) Patent No.: US 12,782,899 B2
(45) Date of Patent: Nov. 3, 2026

(54) CONTROLLING AN AGRICULTURAL SYSTEM BASED ON TIME TO EMPTY AND REFILL COUNT

(71) Applicant: Deere & Company, Moline, IL (US)

(72) Inventors: Mandar Mhalsakant Kale, Pune (IN); Nilesh Dhavan, Pune (IN); Alaka Singh, Pune (IN)

(73) Assignee: Deere & Company, Moline, IL (US)

( * ) Notice: Subject to any disclaimer, the term of this patent is extended or adjusted under 35 U.S.C. 154(b) by 453 days.

(21) Appl. No.: 18/465,574

(22) Filed: Sep. 12, 2023

(65) Prior Publication Data

US 2025/0085679 A1 Mar. 13, 2025

(51) Int. Cl.
*G05B 19/042* (2006.01)

(52) U.S. Cl.
CPC .... *G05B 19/042* (2013.01); *G05B 2219/2601* (2013.01)

(58) Field of Classification Search
CPC .................................................... G05B 19/042
USPC .......................................................... 700/283
See application file for complete search history.

(56) References Cited

U.S. PATENT DOCUMENTS

| | | | | |
|---|---|---|---|---|
| 7,503,510 B2 | 3/2009 | Vickers et al. | | |
| 8,344,897 B2 | 1/2013 | Peterson et al. | | |
| 10,645,864 B2 | 5/2020 | Kowalchuk | | |
| 2003/0197066 A1* | 10/2003 | Hull | G05D 7/0635 | 236/78 D |
| 2004/0244659 A1* | 12/2004 | Mayerle | A01C 7/081 | 111/179 |
| 2010/0070073 A1* | 3/2010 | Foley | G01G 13/20 | 700/304 |
| 2012/0316673 A1* | 12/2012 | Riffel | A01B 63/32 | 700/240 |
| 2013/0311050 A1* | 11/2013 | Cash | A01C 7/102 | 701/50 |
| 2019/0294150 A1* | 9/2019 | Klubertanz | A01C 15/006 | |
| 2020/0060071 A1* | 2/2020 | Kowalchuk | G01F 1/704 | |
| 2021/0078853 A1 | 3/2021 | Long et al. | | |
| 2022/0232816 A1* | 7/2022 | Vandike | A01M 9/0092 | |
| 2022/0374020 A1* | 11/2022 | Tahiliani | G05D 1/661 | |

FOREIGN PATENT DOCUMENTS

| | | |
|---|---|---|
| EP | 2849554 B1 | 9/2019 |
| EP | 4111842 A2 | 1/2023 |

OTHER PUBLICATIONS

Extended European Search Report and Written Opinion issued in European Patent Application No. 24197812.1 dated Feb. 4, 2025, in 13 pages.

* cited by examiner

*Primary Examiner* — Mohammad Ali
*Assistant Examiner* — Joshua T Sanders
(74) *Attorney, Agent, or Firm* — Christopher J. Volkmann; KELLY, HOLT & CHRISTENSON PLLC

(57) ABSTRACT

A weight of material remaining in a container of an application machine is detected, and operation characteristics corresponding to the operation being performed are also obtained. A time to empty value is calculated that is indicative of a time until the container on the material application machine is empty, based upon the weight of material remaining in the container of the application machine and based the operation characteristics. A control signal is generated based upon the time to empty value.

19 Claims, 14 Drawing Sheets

CONTROLLING AN AGRICULTURAL SYSTEM BASED ON TIME TO EMPTY AND REFILL COUNT

FIELD OF THE DESCRIPTION

The present description relates to agricultural systems. More specifically, the present description relates to controlling an agricultural system based upon a calculated time to empty value for agricultural equipment that applies a material to a field.

BACKGROUND

There are a wide variety of different types of agricultural equipment. Some such equipment applies a material to a field.

Some examples of such equipment include a fertilizer spreader which uses a volumetric spreading technique to spread dry matter (which may be particulate or granular matter or powdered, such as fertilizer) on an agricultural field. A bin holds the dry material, which is carried from the bin toward a rear spreader. An air boom includes delivery pipes that are pressurized by a fan. The air pressure moves air from a central region of the boom toward the distal ends, carrying with it the dry material. As material exits the pipes on the boom, the material impacts a deflector which disperses the material onto the agricultural field. Another example of such equipment includes an air seeder that has an air cart with one or more central seed or commodity tanks. The seed or commodity in the tank is metered by a metering system into product delivery tubes and is delivered (using air delivery) to a tool for disbursement. Furrows are opened by a furrow opener and closed after seed is delivered to a furrow by a closer.

During these types of seeding and spreading operations, it is common that the tanks and bins containing the material being applied to the field need to be refilled one or more times, and often several times, in order to cover an entire field. Therefore, tender vehicles often transport additional material to the spreaders and seeders so the tanks and bins can be refilled with material, and so that the spreading and seeding operations can continue to completion.

The discussion above is merely provided for general background information and is not intended to be used as an aid in determining the scope of the claimed subject matter.

SUMMARY

A weight of material remaining in a container of an application machine is detected, and operation characteristics corresponding to the operation being performed are also obtained. A time to empty value is calculated that is indicative of a time until the container on the material application machine is empty, based upon the weight of material remaining in the container of the application machine and based the operation characteristics. A control signal is generated based upon the time to empty value.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed above, it is not uncommon for an application machine (such as a fertilizer spreader or an air seeder) to need to be refilled one or more times when applying a material to a field. In order to perform a refill operation, the operator of the application machine often needs to communicate with the operator of a tender vehicle so that the tender vehicle can carry the material to the application machine in order to refill the application machine. However, the operator of the application machine often has no way of making a specific estimate as to how much time is remaining before the tanks or bins on the application machine become empty. This makes it difficult for the operators of the machines in such and agricultural system to effectively plan refill operations for a particular field operation. This problem may be exacerbated when there are multiple different application machines operating at different locations so that the tender vehicles need to coordinate with the multiple application machines. This can result in wasted time and fuel, and increased machine wear.

Also, some application machines have scales or other weight measurement devices that can be used to detect the weight of material remaining in the tank or bin of the application machine. The present description thus describes a system that receives a weight signal from the scale on the application machine, and calculates a time to empty value which indicates when the application machine will need to be refilled with material. A control signal can then be generated to control the application machine (e.g., the ground speed, the operator interface, a communication system, etc.) based upon the time to empty.

In one example, the time to empty is calculated based upon the weight of material in the tank or bin as well as the mass flow rate of material being applied. The mass flow rate may be detected based upon the rate at which material is being dispensed from the application machine, along with a density of that material. In another example, the time to empty is detected based upon the prescribed or measured application rate and a productivity value indicative of how much of the field is being covered by the application machine per unit time, as well as the remaining weight.

In yet another example, a map can be accessed which indicates different rate zones in a field to which material is being applied. The material may be applied at a different prescribed rate in each zone. The present description describes a system which can estimate the number of refill operations that will be needed in each zone, along with the time to empty for each load of material after the application machine is filled, the overall time to cover the field, among other things. This enhances the efficiency of the application operation in terms of fuel and time. It can also reduce downtime (when waiting for a tender vehicle) and enhance the efficiency of the operation of the tender vehicles.

Figure 1:
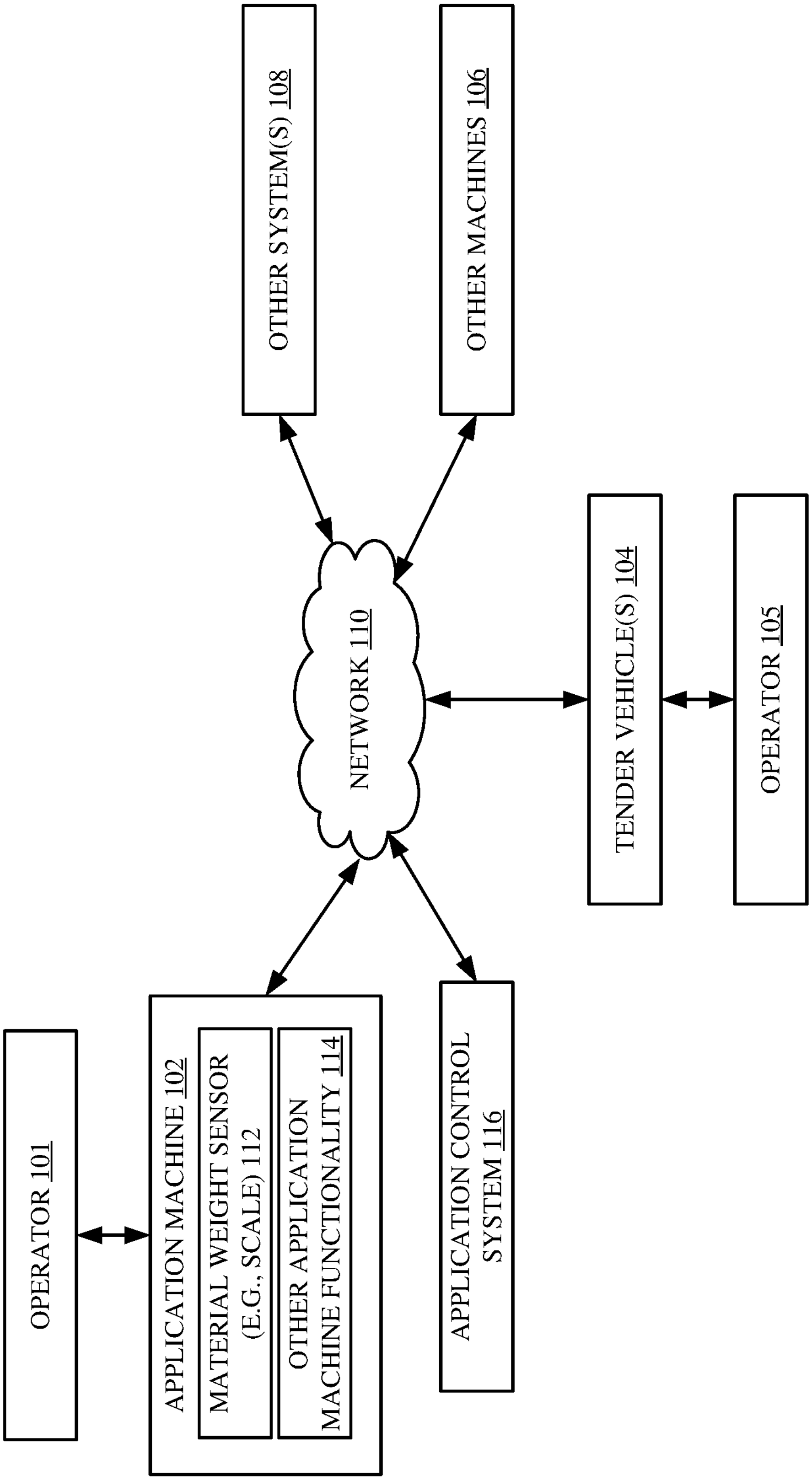
FIG. 1 is a block diagram showing one example of an agricultural system.

FIG. 1 is a block diagram of one example of an agricultural system 100 in which an application machine 102 (which may be an air cart, a dry fertilizer spreader, etc.) is operated by an operator 101 and one or more tender vehicles 104 operated by operators 105. Machine 102 and vehicle(s) 104 can communicate with each other, with other machines 106, and with other systems 108 over a network 110. Network 110 may thus be a wide area network, a local area network, a near field communication network, a cellular communication network, a Wi-Fi or Bluetooth communication network, among a wide variety of other networks or combinations of networks.

In the example shown in FIG. 1, application machine 102 may include a material weight sensor (e.g., a scale) 112, and any of a wide variety of other application machine functionality 114. Agricultural system 100 also illustratively includes an application control system 116 which may be located on application machine 102 (or towing vehicle for application machine 102, such as a tractor) or disbursed among a plurality of locations, or located elsewhere. Other machines 106 may be other application machines, other tender vehicles, or any of a wide variety of other machines. Other systems 108 may include farm manager systems, vendor systems, manufacturer systems, maintenance systems, or other systems.

Briefly, in operation, application machine 102 enters a field and begins applying material to the field. During that operation, material weight sensor 112 provides a weight signal to application control system 116. The weight signal is indicative of the amount of material remaining in the material container on application machine 102. Application control system 116 then generates a time to empty value indicative of an amount of time that application machine 102 can continue to operate before the material container is empty, and must be refilled from a tender vehicle 104. Application control system 116 can also generate control signals to control application machine 102 based on the time to empty value. For instance, the application control system 116 can generate control signals to control the wheel speed or ground speed of application machine 102 in order to reduce the time to empty or increase the time to empty based upon logistics considerations corresponding to tender vehicles 104 or to other portions of agricultural system 100. Application control system 116 can generate control signals to control an operator interface that displays a message for the operator of application machine 102 indicative of the time to empty, and/or other things. Application control system 116 can generate control signals to control a steering system on application machine 102 to control where application machine 102 is located when it becomes empty. Application control system 116 can generate control signals to control a communication system to communicate with the operators of tender vehicles 104, other machines 106, or other systems 108 to generate messages or other information based upon the time to empty value. Also, application control system 116 can access a map of the field on which application machine 102 is operating. The map may identify different application zones where the material is applied by application machine 102 at different rates. Application control system 116 can generate an output indicative of the number of refill operations that will be needed in each zone, and in the field as a whole, as well as the time to empty for each load of material in application machine 102 and the time needed to cover the entire field. For instance, in zones where the material is applied at a first application rate, the time to empty may be a first value. However, in zones where the material is applied at a second application rate, that is higher than the first application rate, then the time to empty value for each load in the second zone may be a lower value than the time to empty value for loads in the first zone. Application control system 116 can perform other operations and generate other outputs as well.

Figure 2:
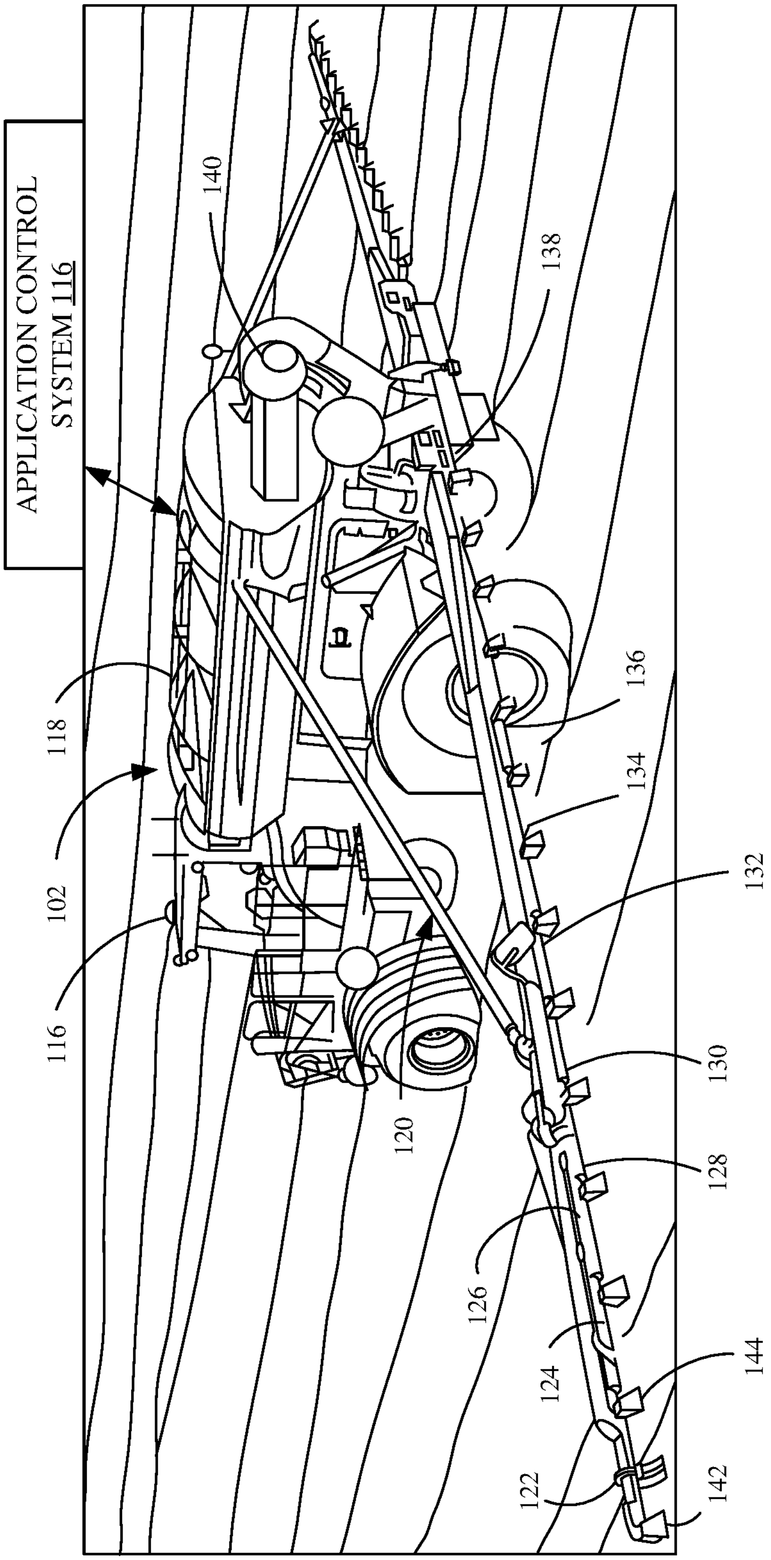
FIG. 2 is a pictorial illustration showing one example of a spreader.

FIG. 2 is a pictorial illustration of one example in which an application machine 102 is embodied as a spreader. Spreader 102 spreads dry matter (which maybe particulate matter or granular matter or powdered matter, such as fertilizer) on an agricultural field. FIG. 2 shows that spreader 102 has an operator compartment 116 and a bin 118. Bin 118 holds the dry material which may be top loaded, or otherwise loaded, into bin 118. A conveyor (not shown) is located beneath bin 118 and carries the dry material, as it drops from bin 118 onto the conveyor, toward the rear of spreader 102.

An air boom 120 includes a plurality of delivery pipes (or conduits), some of which are labeled 122-138. The delivery pipes extend from a generally central region of boom 120 and terminate at different distances from the central region of boom 120 along the longitudinal axis of boom 120. Therefore, some of the pipes terminate closely adjacent the center portion of boom 120, such as pipe 138. Other pipes terminate out further toward the distal end of boom 120, such as pipe 122. While FIG. 2 shows an arrangement for boom 120 on the driver's side of spreader 102, boom 120 may have a similar or different arrangement on the opposite side of spreader 102.

A fan 140 generates air pressure in the delivery pipes of boom 120. The air pressure moves air from the central region of boom 120 toward the distal end and out the exit end of each of the pipes that form boom 120.

Thus, the dry material is moved from bin 118 by the conveyor, into each of the delivery pipes, through a manifold that is connected to the inlet openings of each pipe. The dry material is then carried from where it enters the pipes to the outlet end of each of the pipes by the air introduced into those pipes by fan 140. Each of the pipes has a corresponding deflector (mounted proximate the outlet ends of the pipes) which deflects the material (after it exits the outlet end of the corresponding delivery pipe) downwardly onto the agricultural field over which spreader 102 is traveling. Thus, as shown in FIG. 2, delivery pipe 122 has a corresponding deflector 142. Delivery pipe 124 has a corresponding deflector 144, etc. As the particulate material exits through the outlet end of the corresponding delivery pipe, its corresponding deflector deflects the material downward, through a dispersal area, onto the field.

In one example, the dry material is particulate or granular or powder-like. In such an example, the material flows easily under the influence of the air traveling through the delivery pipes, from an entry manifold (at the inlet end of each pipe) to the exit end of the delivery pipes. The corresponding deflectors then deflect the material downwardly onto the field.

Figure 3:
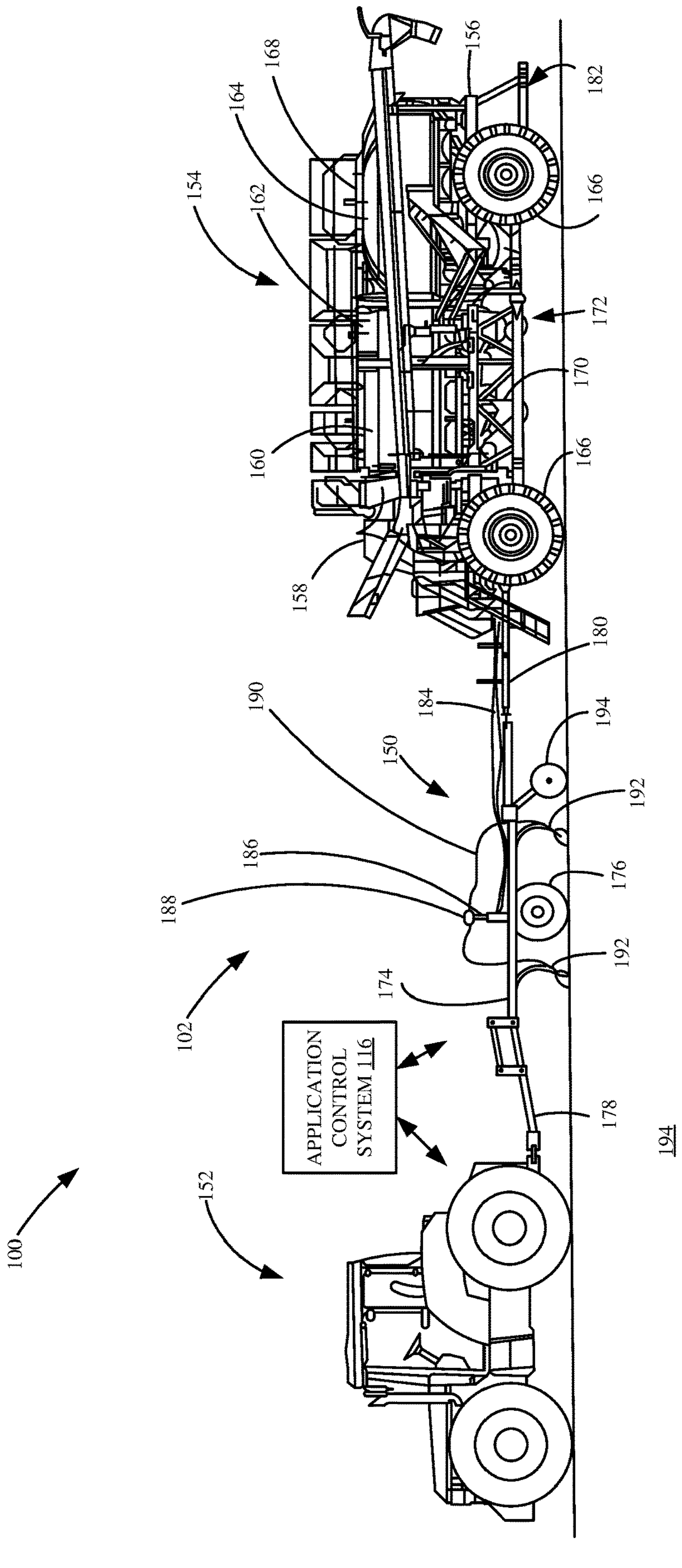
FIG. 3 is a pictorial illustration showing one example of an air seeder.

FIG. 3 is a side view of an example of an agricultural system 100 in which application machine 102 is an agricultural implement, in particular an air or pneumatic seeder 102. In the example shown in FIG. 3, the seeder 102 comprises a tilling implement (also referred to as a material application implement or drill or seeding tool) 150 towed between a tractor (or other towing vehicle) 152 and a commodity cart (also sometimes called an air cart) 154. The commodity cart 154 has a frame 156 upon which a series of product tanks 158, 160, 162, and 164, and wheels 166 are mounted. There may be one or more tanks and four tanks are shown in FIG. 3 as an example only. Each product tank has a door (a representative door 168 is labeled) releasably sealing an opening at the upper end of the tank for filling the tank with product, most usually seed or a commodity of one type or another. A metering system 170 is provided at a lower end of each tank (a representative one of which is labeled in FIG. 3) for controlled feeding or draining of product (most typically granular material) into a pneumatic distribution or delivery system 172. The tanks 158, 160, 162, and 164 can hold, for example, a material or commodity such as seed or fertilizer to be distributed to the soil. The tanks can be hoppers, bins, boxes, containers, etc. The term "tank" shall be broadly construed herein. Furthermore, one tank with multiple compartments can also be provided instead of separate tanks.

The seeding tool 150 includes a frame 174 supported by ground engaging wheels 176. Frame 174 is connected to a leading portion of the commodity cart 154, for example by a tongue style attachment (not labeled). The commodity cart 154 as shown is sometimes called a "tow behind cart," meaning that the cart 108 follows the seeding tool 150. In an alternative arrangement, the cart 154 can be configured as a "tow between cart," meaning the cart 154 is between the tractor 152 and seeding tool 150. In yet a further possible arrangement, the commodity cart 154 and seeding tool 150 can be combined to form a unified rather than separated configuration. These are just examples of additional possible configurations. Other configurations are even possible and all configurations should be considered contemplated and within the scope of the present description.

In the example shown in FIG. 3, tractor 152 is coupled by couplings 178 to seeding tool 150 which is coupled by couplings 180 to commodity cart 154. The couplings 178 and 180 can be mechanical, hydraulic, pneumatic, and electrical couplings, and/or other couplings. The couplings 178 and 180 can include wired and wireless couplings as well.

The pneumatic distribution system 172 includes one or more fans or blowers located generally at 182 connected to a product delivery conduit structure having multiple product flow passages 184 referred to as primary delivery tubes 184. The fan directs air through the primary delivery tubes 184. Each product metering system 170 controls delivery of product from its associated tank at a controllable rate to the transporting airstreams moving through primary delivery tubes 184. In this manner, each flow passage defined by each primary delivery tube 184 carries product from one or more of the tanks to a secondary distribution tower 186 on the seeding tool 150. Typically, there will be one tower 186 for each primary delivery tube 184. Each tower includes a secondary distributing manifold 188, typically located at the top of a vertical tube. The secondary distributing manifold 188 divides the flow of product into a number of secondary distribution tubes 190. Each secondary distribution tube 190 delivers product to one of a plurality of ground engaging tools 192 (also known as ground openers or furrow openers) that define the locations of work points on seeding tool 150. The ground engaging tools (or furrow openers) 192 open a furrow in the soil 194 and facilitate deposit of the product therein. The number of primary delivery tubes 184 that feed into secondary distribution may vary from one to eight or ten or more, depending at least upon the configuration of the commodity cart 154 and seeding tool 150. Depending upon the cart and implement, there may be two distribution manifolds 188 in the air stream between the meters 170 and the ground engaging tools 192. Alternatively, in some configurations, the product is metered directly from the tank or tanks into secondary distribution lines that lead to the ground engaging tools 192 without any need for an intermediate distribution manifold. The product metering system 170 can be configured to vary the rate of delivery of seed or other material to each work point on seeding tool 150 or to different sets or zones or sections of work points on tilling implement 150. The configurations described herein are only examples. Other configurations are possible and should be considered contemplated and within the scope of the present description.

A firming or closing wheel 194 associated with each ground engaging tool 192 trails the tool and firms the soil over the product deposited in the soil. In practice, a variety of different types of tools 192 are used including, but not necessarily limited to, tines, shanks and disks. The tools 192 are typically moveable between a lowered position engaging the ground and a raised position riding above the ground. Each individual tool 192 may be configured to be raised by a separate actuator. Alternatively, multiple tools 192 (or sections of tools) may be mounted to a common component for movement together. In yet another alternative, the tools 192 may be fixed to the frame 174, the frame being configured to be raised and lowered with the tools 140.

Examples of air or pneumatic seeder 102 described above should not be considered limiting. The features described in the present description can be applied to any seeder configuration, or other material application machine or material application implement, whether specifically described herein or not.

Figure 4:
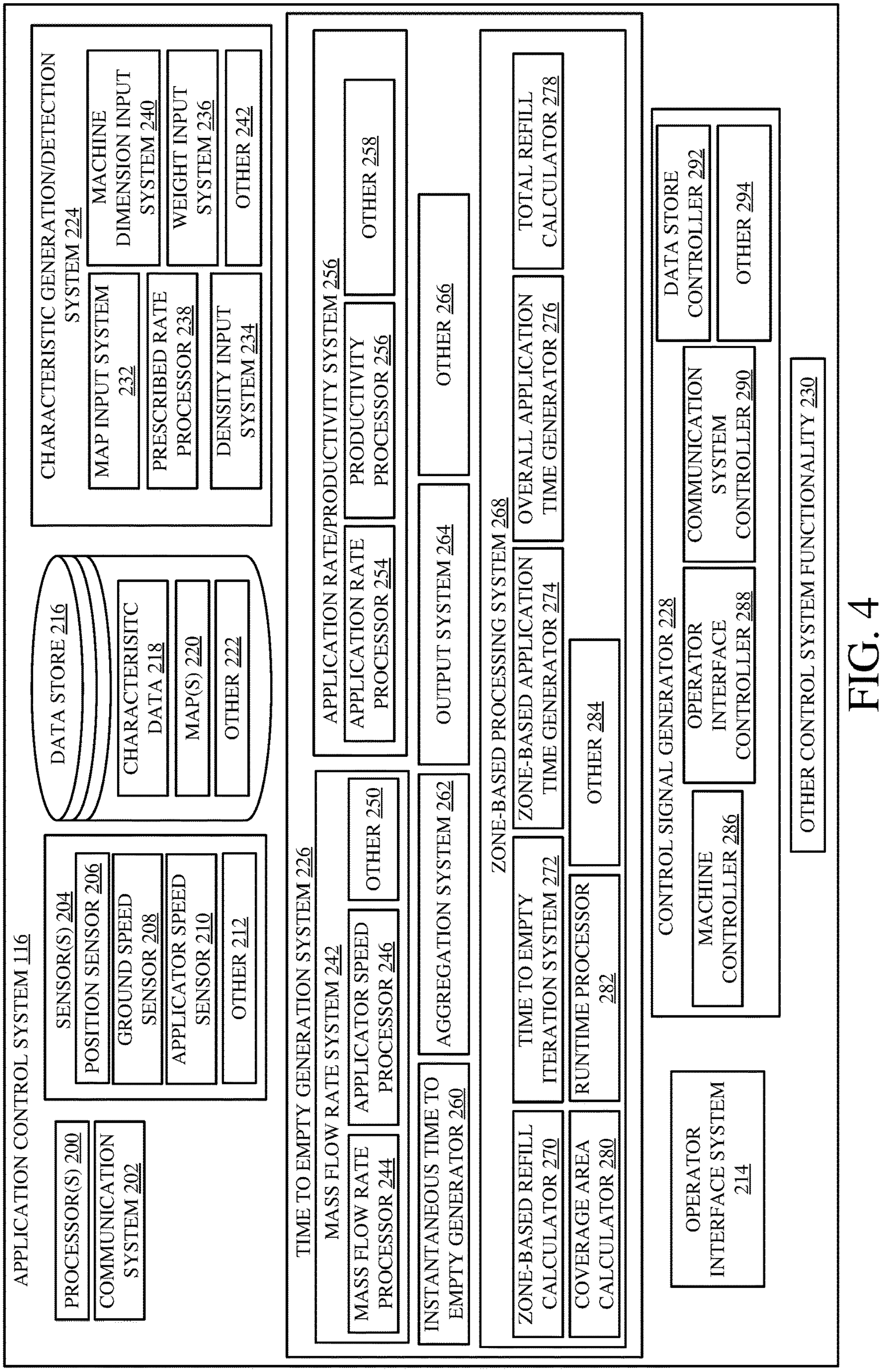
FIG. 4 is a block diagram showing one example of an application control system, in more detail.

FIG. 4 is a block diagram showing one example of application control system 116 in more detail. In the example shown in FIG. 4, application control system 116 includes one or more processors 200, communication system 202, and sensors 204 which can include a position sensor 206, ground speed sensor 208, applicator speed sensor 210, and any of a wide variety of other sensors 212. Application control system 116 includes operator interface system 214, data store 216 (which includes characteristic data 218, maps 220, and other items 222), characteristic generation/detection system 224, time to empty generation system 226, control signal generator 228, and other control system functionality 230. Characteristic generation/detection system 224 includes map input system 232, density input system 234, weight input system 236, prescribed rate processor 238, machine dimension input system 240, and other items 242. Time to empty generation system 226 includes mass flow rate system 244 (which can include applicator speed processor 246, mass flow rate processor 248, and other items 250), application rate/productivity system 252 (which can include application rate processor 254, productivity processor 256, and other items 258), instantaneous time to empty generator 260, aggregation system 262, output system 264, other items 266, and zone-based processing system 268. Zone-based processing system 268 can include zone-based refill calculator 270, time to empty iteration system 272, zone-based application time generator 274, overall application time generator 276, total refill calculator 278, coverage area calculator 280, runtime processor 282, and other items 284. Control signal generator 228 includes machine controller 286, operator interface controller 288, communication system controller 290, data store controller 292, and other items 294. Before describing the overall operation of application control system 116 in more detail, a description of some of the items in application control system 116, and their operation, will first be provided.

Communication system 202 facilitates communication of the items in application control system 116 with one another, and with other items on application machine 102 (such as the material weight sensor 112) and other vehicles 104, machines 106, and systems 108 over network 110. Therefore, communication system 202 can be a controller area network (CAN) bus and bus controller that facilitates communication of items in system 116 with one another and, for communicating over a wide area network a local area network, a near field communication network, a Bluetooth or Wi-Fi network, a cellular communication network, or any of a wide variety of other networks or combinations of networks.

Position sensor 206 can include a global navigation satellite system (GNSS) sensor, a dead reckoning sensor, a cellular triangulation sensor, or any of a wide variety of other sensors that provide the location of sensor 206 in a global or local coordinate system. Ground speed sensor can be a speedometer, a sensor that senses the speed of the wheels or other ground engaging elements, or a sensor that derives the ground speed of application machine 102 from other sensors (such as a system that receives two consecutive position signals from position sensor 206 and calculates the ground speed of application machine 102 based on those two sensor readings, etc.).

Applicator speed sensor 210 senses a variable indicative of the rate at which an applicator on machine 102 is applying material to the field. For instance, where a belt drives a rotary item that spreads material then the applicator speed sensor 210 may be a sensor that identifies the belt speed in revolutions per minute (RPM). Where the applicator includes a conveyor that conveys material, then the applicator speed sensor 210 may be a sensor that senses the speed of the conveyor. The applicator speed sensor 210 may be any of a wide variety of other speed sensors as well.

Operator interface system 214 may include operator interface mechanisms such as levers, joysticks, a steering wheel, a display device, a microphone and speaker (as well as speech recognition and speech synthesis functionality), and any of a wide variety of other operator interface mechanisms. The operator interface system can generate audio, visual, or haptic outputs and sense operator inputs as well.

Characteristic generation/detection system 224 obtains, generates, or detects characteristics that can be used by time to empty generation system 226 to calculate a time to empty, a number of refills, etc. Map input system 232 can access map 220 that shows application zones in a field of interest. The application zones may identify the size of each zone, the application rate prescribed for each zone, a number of passes that the machine will take in each zone, among other information. Prescribed rate processor 238 obtains the prescribed application rate for a field, or for the different zones in the field. The prescribed application rate may be obtained from maps 220 or other characteristic data 218 stored in data store 216 or obtained from other machines or other systems. Density input system 234 obtains the density of the material being applied. The density may be sensed, input by an operator, accessed from characteristics data 218 in data store or elsewhere, or obtained or detected in other ways. Machine dimension input system 240 obtains or detects the dimension data corresponding to application machine 102. The dimension data can be obtained from characteristic data 218, input by an operator, or detected and obtained in other ways as well. The dimension data, for instance, can indicate the width of the application which will define the width of the field that will have material applied to it on each pass of machine through the field. Weight input system 236 detects or obtains the weight of material remaining in application machine 102. For instance, weight input system 236 can obtain the weight from material weight sensor 112.

Based upon the inputs from sensors 204 and/or the characteristics from characteristic generation/detection system 224, time to empty generation system 226 generates a time to empty. Mass flow rate system 244 generates the time to empty based upon the mass flow rate of material through machine 102. For instance, applicator speed processor 246 detects the speed of the applicator (such as from applicator speed sensor 210) in revolutions per minute. Mass flow rate processor 248 then detects the mass flow rate of material being applied by application machine 102 according to Equation 1 below.

$$\text{Mass flow rate} = [\text{Applicator Speed(e.g., Belt speed in } (RPM) * \text{Product Density}(\text{lb/cubic ft}) * CRF(\text{cubic ft/revolution})] \quad \text{EQ. 1}$$

Processor 248 obtains the product density in pounds per cubic foot as well as a conversion factor in cubic feet per revolution, which correlates the applicator speed and product density to obtain the mass flow rate of material in pounds per minute. Mass flow rate system 244 then obtains the current weight from weight input system 236 of material remaining in application machine 102 and generates the time to empty value using Equation 2.

$$\text{Time To Empty (min)} = [\text{Current weight(lb)/Mass flow rate}(\text{lb/min})] \quad \text{EQ. 2}$$

The time to empty value may be dynamically updated based on the changes in applicator speed.

Application rate/productivity system 250 generates a time to empty value based upon the desired application rate (or prescribed application rate) and based on a productivity value which indicates the number of acres to which material will be applied by machine 102 per unit of time (e.g., per minute). Application rate processor 254 obtains the prescribed or current application rate of material in weight per area (e.g., pounds per acre) and productivity processor 256 obtains the productivity value in area per time (e.g., in acres per minute). Application rate productivity system 250 then generates the time to empty value according to Equation 3 below.

$$\text{Time to Empty(min)} = [\text{Product weight(lb)}/(\text{Rate(lb/ac)} * \text{Productivity(ac/min)})] \quad \text{EQ. 3}$$

Whether the time to empty value is generated based on the mass flow rate in system 244 or the application rate and productivity in system 250, the instantaneous time to empty values can be generated by instantaneous time to empty generator 260. Those values can be aggregated by an aggregation system 262 (such as averaged, aggregated using a rolling average, filtered, or otherwise aggregated), and output system 264 can generate an output indicative of the instantaneous time to empty value or the aggregated time to empty value, or both. The output generated by output system 264 can be provided to control signal generator 228 for the generation of control signals, which is described in greater detail below.

Zone-based processing system 268 can obtain a map having different application zones and generate an output indicative of the number of refill operations that will be needed per zone, the time that it will take to empty each load after a refill operation, the overall number of refill operations for all of the zones in a field, the total time that the operation will take for all of the zones in the field, among other things. Zone-based refill calculator 220 obtains the prescribed application rate per zone from characteristic generation/detection system 224 and identifies the number of refill operations that will be needed per zone in a field. Time to empty iteration system 272 can iterate over each refill operation to generate a time that will be needed to empty the application machine 102 after it is refilled. Of course, the time to empty will depend on the application rate and the weight of material that is filled into the application machine 102. Zone-based application time generator 274 can aggregate the time to empty within a given zone to identify the overall time that will be needed to apply material to each zone. Overall application time generator 276 can aggregate the times per zone to obtain the overall time that machine 102 will need to apply material to a field. Total refill calculator 278 can aggregate the total number of refill operations per zone to obtain an overall total number of refill operations that will be needed to treat a field. Coverage area calculator 280 can be used to identify the total area of the field that will be covered per refill operation, and runtime processor 282 can be used to obtain updated instantaneous or aggregated time to empty values during runtime.

Machine controller 286 can generate control signals to control such things as the propulsion system or steering system of the application machine, or the machine that is providing propulsion to the application machine. Operator interface controller 288 can generate control signals to control operator interface system 214, such as to generate a warning or countdown for the operator indicative of the time to empty, or to generate other operator interfaces. Communication system controller 290 can control communication system 202 to send a message to the operator of a tender vehicle 104 or to other machines 106 or other systems 108. Data store interaction controller 292 can generate control signals to control data store 216 or another data store to retrieve information from the data store or to store information in the data store, or to interact with the data store in other ways.

Figure 5:
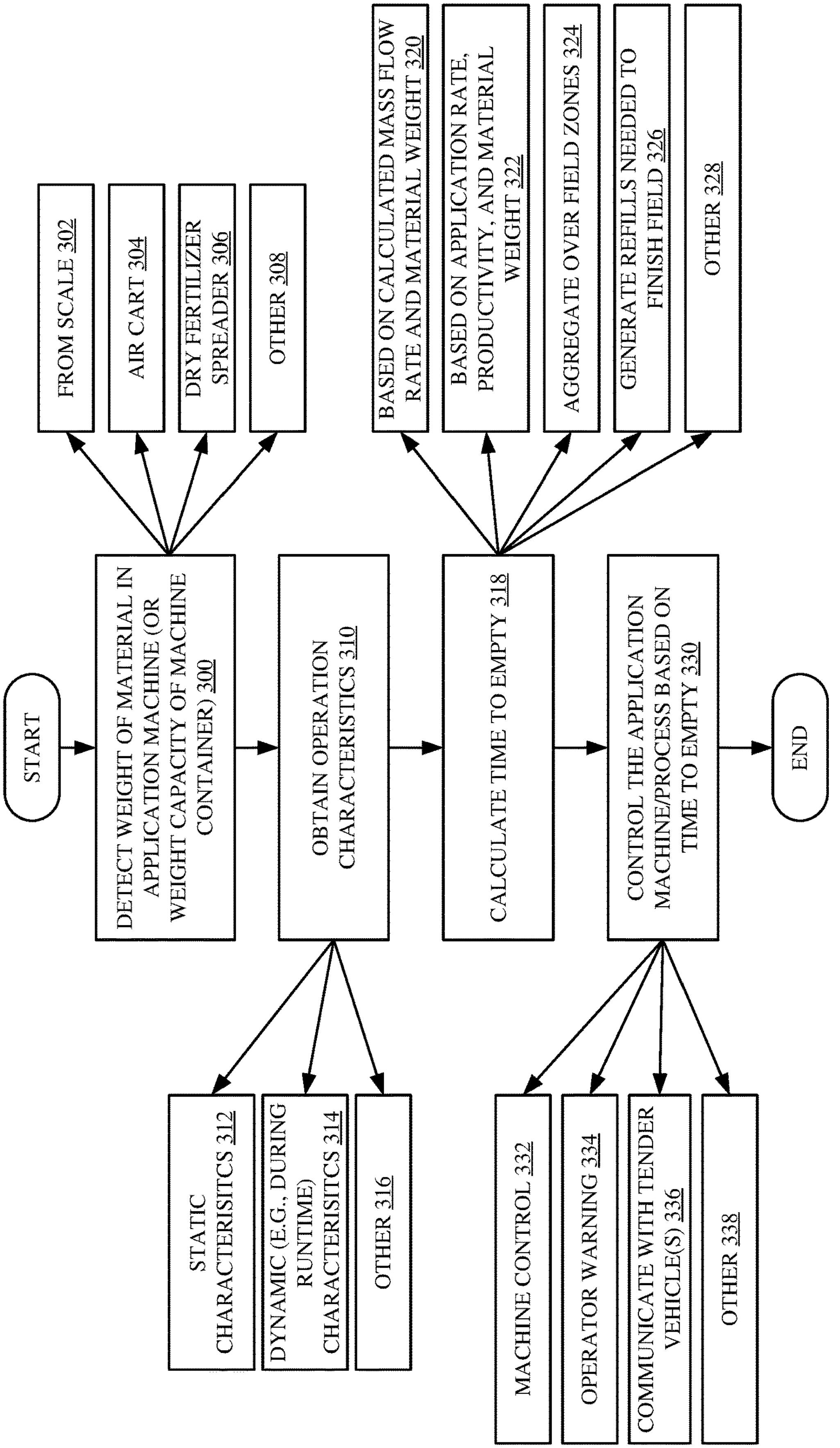
FIG. 5 is a flow diagram illustrating one example of the operation of the application control system.

FIG. 5 is a flow diagram showing one example of the overall operation of application control system 160. It is first assumed that weight input system 236 obtains or detects 4 the weight of material in application machine 102 (and/or the weight capacity of application machine 102). For instance, weight input system 236 can receive an input from material weight sensor 112 indicative of the weight of material remaining in machine 102, and/or obtain the weight carrying capacity for material corresponding to machine 102 form characteristic data 118 or in other ways. Detecting the weight of the material in application machine 102, and/or the weight capacity of material in machine 102 is indicated by block 300 in the flow diagram of FIG. 5. Obtaining the weight remaining in vehicle 103 from material weight sensor 112 (or scale 112) is indicated by block 302. A scenario in which the application machine 102 is an air cart is indicated by block 304. A scenario in which the application machine 102 is a dry fertilizer spreader is indicated by block 306. The weight of material in the application machine can be obtained in other ways, and the application machine can take other machine forms as well, as indicated by block 308.

Characteristic generation/detection system 224 then obtains operation characteristics corresponding to the application operation being performed by machine 102 (or about to be performed by machine 102) so that time to empty generation system 226 can generate desired values. Obtaining the operation characteristics is indicated by block 310 in the flow diagram of FIG. 5. The characteristics can be static characteristics 312, such as the dimensions of application machine 102, the size of the field and zones within the field, the density of the product being applied, or any of a wide variety of other static characteristics. The operation characteristics can also be dynamic characteristics 314 that may change during runtime, such as the applicator speed, the productivity of the application machine 102, or other dynamic characteristics. The operation characteristics can be other characteristics or obtained in other ways as well, as indicated by block 316 in the flow diagram of FIG. 5.

Based upon the operation characteristics, time to empty generation system 226 calculates a time to empty value, as indicated by block 318 in the flow diagram of FIG. 5. The time to empty value can be based upon the calculated mass flow rate and material weight from mass flow rate system 244, as indicated by block 320. The time to empty value can be based upon an application rate, a productivity value, and a material weight, from application rate/productivity system 250, as indicated by block 322 in the flow diagram of FIG. 5. Zone-based processing system 268 can generate time to empty values for individual zones or aggregated over a plurality of zones in a field as indicated by block 324, and can also generate the number of refills needed to finish individual zones in a field or the entire field, as indicated by block 326. Time to empty generation system 226 can generate a wide variety of other values as well, as indicated by block 328 in FIG. 5.

Output system 264 can output the values generated by time to empty generation system 226 to control signal generator 228 which generates control signals to control the application machine 102 and/or the application or refill process based on the time to empty values, as indicated by block 330 in the flow diagram of FIG. 5. For instance, machine controller 226 can generate control signals to perform machine control 332. Operator interface controller 288 can generate control signals to generate an operator warning or to control operator interface system 214 in other ways, as indicated by block 334. Communication system controller 290 can generate control signals to control communication system 202 to communicate with tender vehicles 104 or other systems or machines, as indicated by block 336.

Control signal generator 228 can generate control signals to perform other control operations as well, as indicated by block 338.

Figure 6:
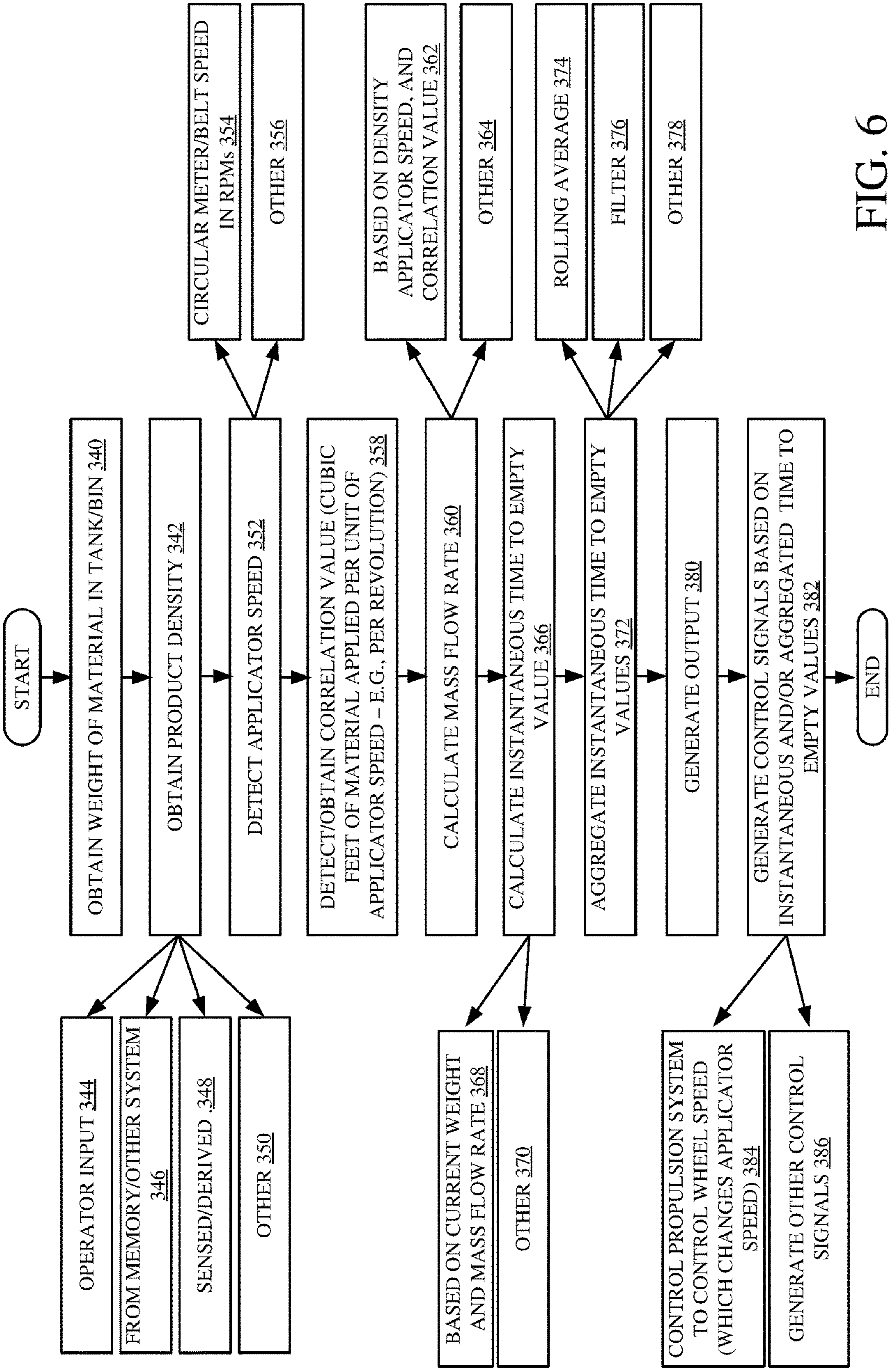
FIG. 6 is a flow diagram illustrating one example of the operation of the application control system in more detail.

FIG. 6 is a flow diagram illustrating one example of the operation of mass flow rate system 244 in generating a time to empty value and of control signal generator 228 in generating 19 control signals based upon that time to empty value.

Mass flow rate system 244 first obtains a value indicative of the weight of material remaining in the tank or bin or other container on application machine 102, as indicated by block 340 in the flow diagram of FIG. 6. Mass flow rate system 244 also obtains a value indicative of the density of the product or material being applied, as indicated by block 342. The density value can be obtained based on an operator input through operator interface system 214, as indicated by block 344 or from memory or another data store (e.g., from characteristic data 218 in data store 216) as indicated by block 346. The product density value can be sensed or derived in other ways, as indicated by block 348, or the product density value can be obtained in a different way, as indicated by block 350.

Applicator speed processor 246 then obtains an applicator speed value, as indicated by block 352 in the flow diagram of FIG. 6. The applicator speed value can be detected using applicator speed sensor 210 which may detect the revolutions per minute of a circular meter or, of a belt that transfers material to the applicator, as indicated by block 354 in the flow diagram of FIG. 6. The applicator speed value can be obtained in other ways as well, as indicated by block 356. Mass flow rate processor 248 detects or obtains a correlation value that can be used to obtain the mass flow rate of the material, given the applicator speed and the product density. Detecting or obtaining the correlation value is indicated by block 358 in the flow diagram of FIG. 6. Mass 6 flow rate processor 248 then calculates the mass flow rate of material being applied by application machine 102, as indicated by block 360. The mass flow rate may illustratively be based on the 8 density of the material, the applicator speed, and the correlation value, as indicated by block 362, and as illustrated by Equation 1 above. The mass flow rate of material being applied by application machine 102 can be obtained in other ways as well, as indicated by block 364.

The weight of the material remaining in application machine 102, as well as the mass flow rate, are provided to instantaneous time to empty generator 260 which generates an instantaneous time to empty value as indicated by block 366. The instantaneous time to empty value, when based upon the current weight of material and the mass flow rate is indicated by block 368 and may be obtained using Equation 2 above. The instantaneous time to empty value can be obtained in other ways as well as indicated by block 370. Aggregation system 262 can aggregate a plurality of different instantaneous time to empty values, as indicated by block 372. The aggregation may, for instance, be a rolling average 374, a filtered value 376 which filters out anomalous instantaneous readings, or another aggregated value 378. Output system 264 generates an output, as indicated by block 380, which can be provided to control signal generator 228 and/or zone-based processing system 268. Control signal generator 228 can generate control signals based upon the instantaneous and/or aggregated time to empty values, as indicated by block 382 in the flow diagram of FIG. 6. For instance, machine controller 286 can control the propulsion system to control the wheel speed of application machine 102 (and possibly to change the applicator speed as well), as indicated by block 384 in the flow diagram of FIG. 6. Other control signals can be generated, as indicated by block 386 in the flow diagram of FIG. 6.

Figure 7:
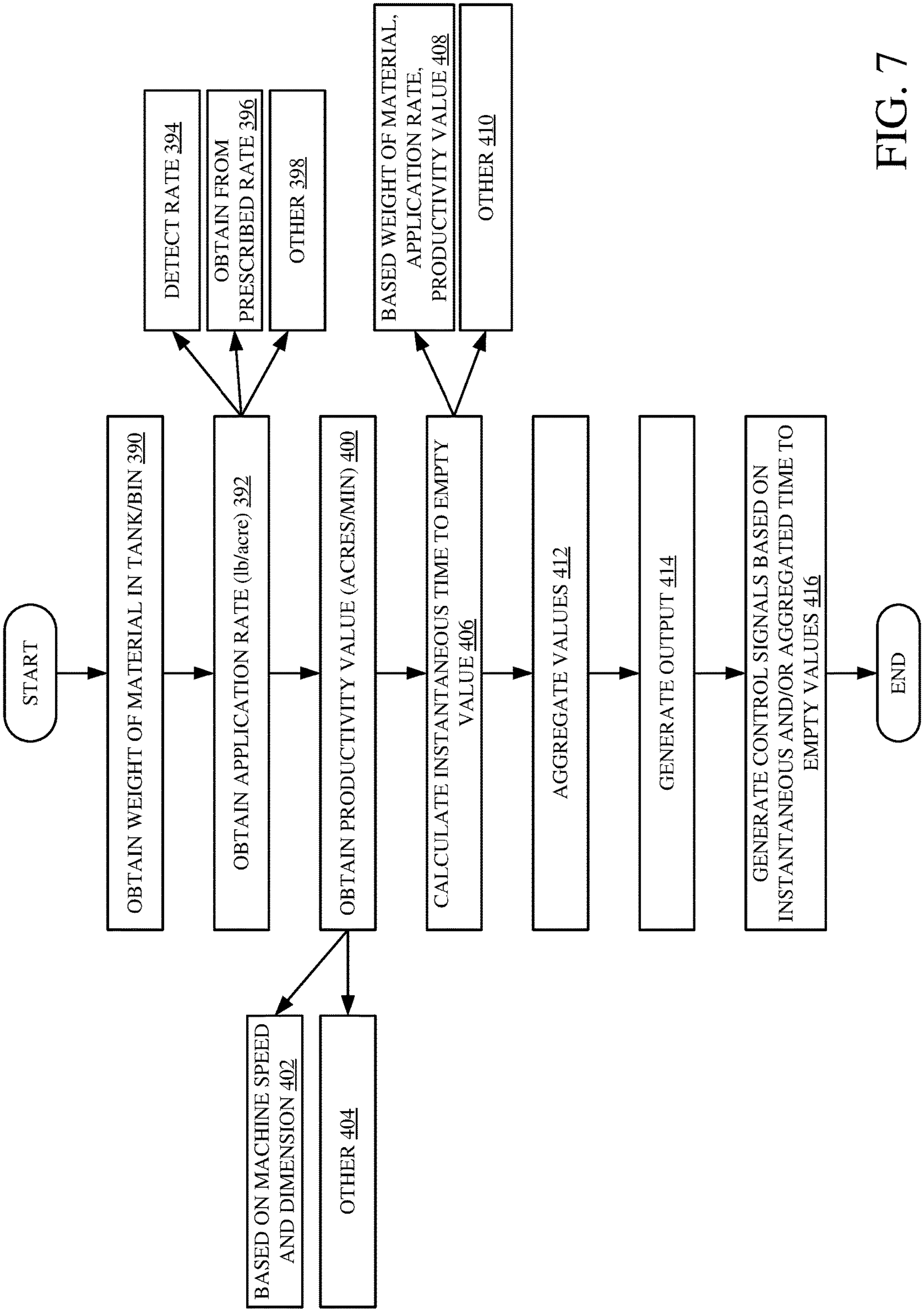
FIG. 7 is a flow diagram illustrating one example of the operation of the application control system in more detail.

FIG. 7 is a flow diagram illustrating one example of the operation of application rate/productivity system 250 in generating values that are used to obtain a time to empty value, in more detail. As indicated with respect to block 340 in FIG. 6 above, application rate/productivity system 250 obtains a weight of material remaining in the tank or bin of application machine 102. Obtaining the weight is indicated by block 390 in the flow diagram of FIG. 7. Application rate processor 254 then obtains the prescribed or current application rate of material for machine 102, such as in units of weight per area (e.g., pounds per acre). Obtaining the application rate is indicated by block 392. In one example, the application rate is detected by a sensor 204, as indicated by block 394. In another example, the application rate is a prescribed application rate that is prescribed for an area of a field over which machine 102 is traveling or is about to travel, as indicated by block 396. A prescribed application rate can be obtained, for instance, from a map 220 or from prescribed rate processor 238 or in other ways. The application rate can be obtained in other ways as well, as indicated by block 398.

Productivity processor 256 then obtains or generates a productivity value which indicates how productive machine 102 is in applying material to the field. The productivity value may, for instance, be in units of area per time (such as acres per minute), as indicated by block 400 in the flow diagram of FIG. 7. The productivity value may be based upon the ground speed of machine 102 as well as the machine dimensions (such as the length of a boom in a spreader, or the width of a tool (or number of row units in a tool), for example. Obtaining the productivity value based upon the machine speed and machine dimensions is indicated by block 402. The machine dimensions may be part of characteristic data 218, or the dimensions may obtained in other ways. The productivity value corresponding to machine 102 can also be obtained or detected in other ways as well, as indicated by block 404 in the flow diagram of FIG. 7.

Based upon the values generated or obtained by application rate/productivity system 250, instantaneous time to empty generator 260 calculates or generates an instantaneous time to empty value for machine 102, as indicated by block 406. The time to empty is illustratively calculated using Equation 3 above based on the weight of material remaining in machine 102, the application rate, and the productivity value, as indicated by block 408. The instantaneous time to empty value can be calculated or generated in other ways as well, as indicated by block 410.

Aggregation system 262 can aggregate the values as indicated by block 412 and output system 264 can provide an output based upon the instantaneous and/or aggregate time to empty values, as indicated by block 414. Control signal generator 222 can then generate control signals based upon the instantaneous and/or aggregated time to empty values, as indicated by block 416.

Figure 8:
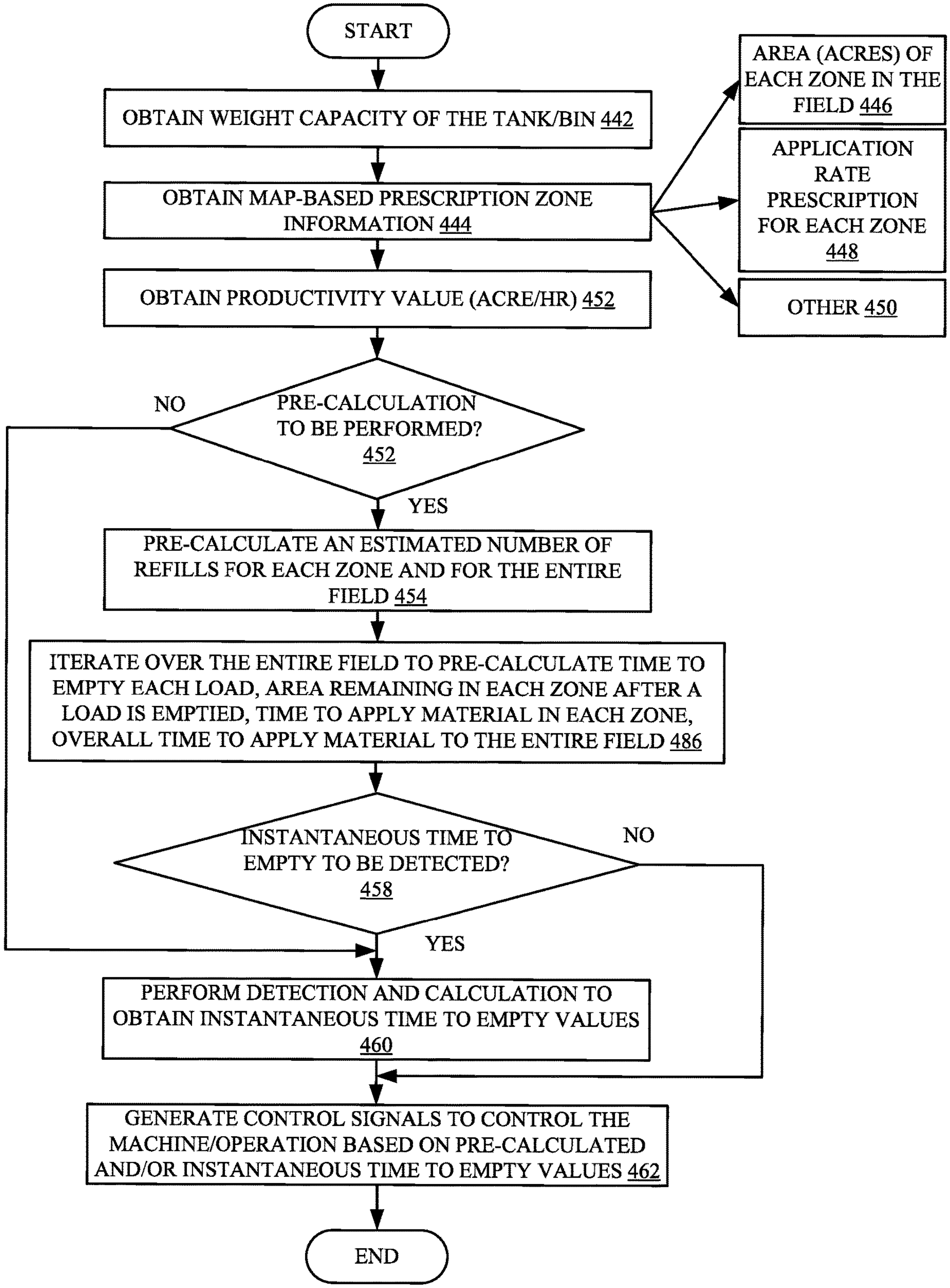
FIG. 8 is a flow diagram illustrating one example of the operation of the application control system in calculating time to empty for a plurality of different zones in a field, as well as a number of refills needed to cover the field.
Figure 9:
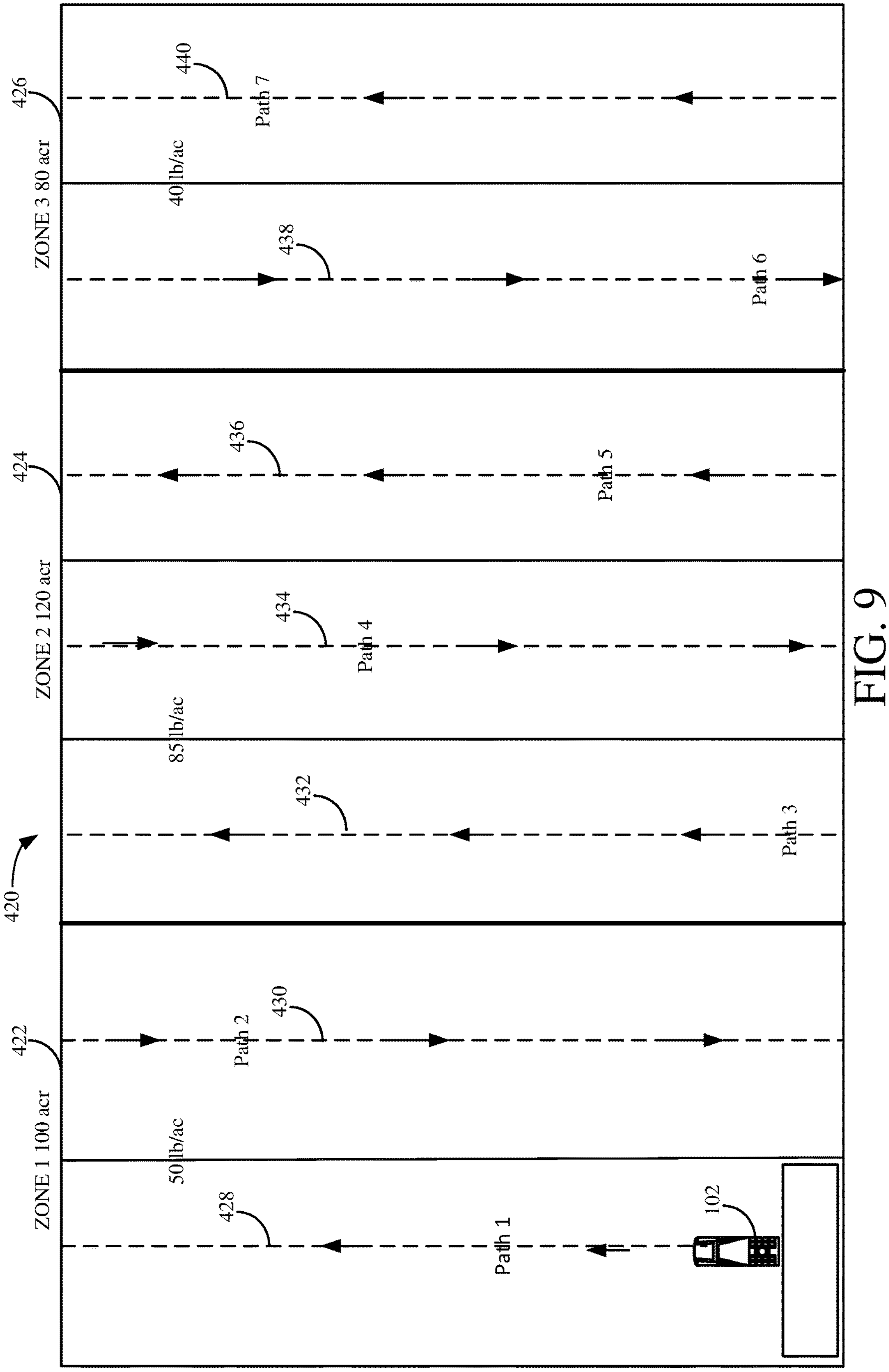
FIG. 9 shows one example of a field deployed in a remote server environment.

FIG. 8 is a flow diagram illustrating one example of the operation of zone-based processing system 268 in more detail. FIG. 9 a pictorial illustration showing one example of a field 420 with a plurality of zones 422, 424, and 426. FIGS. 8 and 9 will be described in conjunction with one another.

The operation of zone-based processing system 268 will be described in conjunction with the field illustrated in FIG. 9, for the sake of example only. FIG. 9 shows that zone 422 is 100 acres and will be covered by two passes of an application machine 102 designated by dashed lines 428 and 430 in FIG. 9. FIG. 9 also shows that zone 424 is 120 acres and will be covered by machine passes illustrated by dashed lines 432, 434, and 436. FIG. 9 also shows that zone 426 is 80 acres and will be covered by two machine passes indicated by dashed lines 438 and 440. Also, FIG. 9 shows that the prescribed application rate for zone 422 is 50 pounds per acre. The prescribed application rate for zone 424 is 85 pounds per acre, and the prescribe application rate for zone 426 is 40 pounds per acre. In one example, the field illustrated in FIG. 9 is captured in a map 220 which identifies the zones, the machine passes, the prescribed rate, and the sizes of each zone. The map 220 can include a wide variety of other information as well, such as the geographic location of the zones, the overall acreage of the field, the navigation lines or passes 428-440, among other things.

As discussed above with respect to the other systems, zone-based processing system 268 first obtains the weight capacity of application machine 102, which may indicate the number of pounds of material that application machine 102 will be filled to during a refill operation. Obtaining the weight capacity is indicated by block 442 in the flow diagram of FIG. 8.

Prescribed rate processor 238 then provides system 268 with the map-based prescription zone rates, as indicated by block 444. For instance, system 268 can be provided with the area (e.g., in acres) of each zone 422, 424, and 426 in field 420, as indicated by block 446 in the flow diagram of FIG. 8. System 268 can also be provided with the application rate prescribed for each zone (such as 50 pounds per acre for zone 22, 85 pounds per acre for zone 424, and 40 pounds per acre for zone 426) as indicated by block 448 in the flow diagram of FIG. 8. The map-based prescription zone information can include other information 450 as well. System 268 also obtains a productivity value (e.g., in acres per hour or acres per minute) from productivity processor 256, as indicated by block 452 in the flow diagram of FIG. 8.

In one example, zone-based processing system 268 is configured to perform pre-calculations to identify information prior to beginning the application of material to field 420. The pre-calculations, for instance, may include the number of refill operations that will be needed, the time that it will take to empty each time machine 102 is filled, the aggregate time to apply material to the field and to each zone, among other things. Deciding whether to perform pre-calculations can be based on an operator input, or another input that configures zone-based processing system 268. For instance, if a logistics planning system wishes to have the pre-calculated inputs, then zone-based processing system 268 can be configured to generate the pre-calculated values and provide them to the logistics system. The decision as to whether to perform pre-calculations can be based on other criteria as well. Determining whether pre-calculations are to be performed is indicated by block 452 in the flow diagram of FIG. 8.

Assuming that zone-based processing system 268 is to perform the pre-calculations, then zone-based refill calculator 220 pre-calculates an estimated number of refills for each zone 422, 424, and 426 in the entire filed 420, as indicated by block 454 in the flow diagram of FIG. 8. For instance, given the prescribed application rate of 50 pounds per acre, and the total area of zone 422, then zone-based refill calculator 220 calculates the total amount of material required to cover zone 422. This can be done for each of the zones 422, 424, and 426. Then, based upon the capacity of machine 102 to carry material at each refill, and the productivity (the number of acres per unit time that is covered by the machine 102), the total number of refills needed for each zone can be calculated as indicated in Equation 4 below.

No. of Refill Required=Total Commodity Required to cover Zone area/Tank Capacity EQ.4

Assume, for instance, that the material capacity of machine 102 is 3,000 pounds and the productivity for machine 102 is 30 acres per hour. Also, using the specified application rate for zone 422, the total commodity required to cover zone 422 will be 50 lb per acre*100 acres=5,000 lb. The total commodity required to cover zone 424 will be 85 lb per acre*120 acres=10,200 lb, and the total amount of material required to cover zone 426 will be 40 lb per acre*80 acres=3,200 lb.

According to Equation 4, the total number of refills per zone can be calculated. Aggregating those refills over all zones gives the number of refills per field. Similarly, the area covered per refill, the time to empty for each refill, the remaining area to cover in the field, the product dispensed in each zone, with each fill and in the entire field, and the total field time can be calculated for the zones shown in FIG. 9 as illustrated in Table 1 below.

TABLE 1

| Zone Map | Refill Instances | Area Covered(ac) = (Tank Current Capacity(lb)/ Rate(lb/ac)) | Time to Empty(hrs) = (Area Covered(ac)/ Productivty(ac/hrs)) | Area remaining | Tank Current Capacity | Product Dispensed (lb) = (Area Covered(ac)*Rate((lb/ac)) | Total Field Time(hrs) |
|---|---|---|---|---|---|---|---|
| Zone | 1 | 60 | 2 | 40 | 3000 | 3000 | 3.33 |
| 1 | 2 | 40 | 1.33 | 0 | 3000 | 2000 | |
| Zone | 2 | 11.8 | 0.39 | 108.2 | 1000 | 1000 | 4.0 |
| 2 | 3 | 35.3 | 1.18 | 72.9 | 3000 | 3000 | |
| | 4 | 35.3 | 1.18 | 37.6 | 3000 | 3000 | |
| | 5 | 35.3 | 1.18 | 2.4 | 3000 | 3000 | |
| | 6 | 2.4 | 0.08 | 0.0 | 3000 | 200 | |
| Zone | 6 | 70.0 | 10.0 | 10.0 | 2800 | 2800 | 2.33 |
| 3 | 7 | 10.0 | 0.0 | 0.0 | 400 | 400 | |

For instance, zone-based refill calculator 220 can calculate the number of refills for each zone. Time to empty iteration system 272 can calculate the time to empty after each refill and the total time needed to apply material to each zone. Zone-based application time generator 274 can calculate the total time to apply material to each zone and general application time generator can generate the overall time needed to apply material to the entire field. Total refill calculator 278 can calculate the total number of refills needed to cover the field and coverage area calculator 280 can calculate the area covered for each refill operation. Coverage area calculator 280 can calculate the area covered as well as the area remaining in each zone, and over the field as a whole. These are only examples of items that can be calculated.

Pre-calculating an estimated number of refills for each zone and for the entire field is indicated by block 454 in the flow diagram of FIG. 8. Iterating over the entire field to pre-calculate the time to empty for each load (after each refill operation) and the area remaining in each zone after a load has been emptied, as well as the time to apply material in each zone and the overall time to apply material to the entire field is indicated by block 456 in the flow diagram of FIG. 8. In one example, runtime processor 282 can also be used to obtain instantaneous time to empty values from instantaneous time to empty generator 260. Obtaining instantaneous time to empty values can be performed using mass flow rate or application rate and productivity as described above with respect to FIGS. 6 and 7, respectively.

Control signal generator 228 can then generate control signals to control the machine and/or application operation based upon the pre-calculated values and/or instantaneous time to empty values. Generating such control signals is indicated by block 462 in the flow diagram of FIG. 3.

Referring again to Table 1, when an operator starts a map-based seeding or spreading operation, assume that the current tank capacity is 3,000 pounds given the prescription rate for zone 422, a full tank capacity will cover 60 acres. Also, given a productivity of 30 acres per hour, the first 60 acres of zone 422 will be covered in two hours. The amount of product to be dispensed will be 3,000 pounds for the first 60 aces of zone 422.

When a second refill operation is performed, there will still be 40 acres remaining in zone 422 so the whole capacity of the second refill will not be needed to finish zone 422. Instead, 2,000 pounds of product weight from the tank will be dispensed over the final 40 acres of zone 422, and a time to complete zone 422 will be 1.33 hours. The remaining 1,000 pounds in the tank can then applied to zone 424, and given the prescribed application rate of 85 pounds per acre, the area covered in zone 424 will be 11.8 acres, and the time to dispense the remaining 1,000 pounds will be 0.39 hours. At that point, a third refill operation is needed as the tank is now empty after dispensing the remaining 1,000 pounds carried over from zone 422. The tank is again filled to its capacity of 3,000 pounds and, given a prescribed application rate of 85 pounds per acre, the tank will cover 35.3 acres in zone 424 and it will take 1.18 hours to empty the tank.

At that point, a fourth refill operation is needed to fill the tank to its 3,000 pound capacity. Another 35.3 acres of zone 424 can be covered, at which point the tank will be empty and a fifth refill operation is needed. The tank is filled to its 3,000 pound capacity and another 35.3 acres of zone 424 is covered. A sixth refill operation is then performed and the tank is again refilled to its capacity of 3,000 pounds. The remaining 2.4 acres of zone 424 can then be covered with 200 pounds of product taking 0.08 hours. The operation then continues in zone 426 where the machine 102 will begin applying material at zone 426 with 2,800 pounds of material in the tank. Given a prescribed application rate of 45 pounds per acre, 70 aces of zone 426 can be covered, in 2.33 hours, before the tank is empty. The tank can then be refilled again to cover the remaining 10 acres of zone 426 at the prescribed rate of 40 pounds per acre to dispense an additional 400 pounds of material over a time of 0.33 hours. All of this information is captured in Table 1. It can be seen that the total number of refill operations to cover the field is seven refills and the total time to treat the field is 9.66 hours which can be obtained by aggregating the total time to treat each zone (3.33 hours+4.00 hours+2.33 hours).

It can thus be seen that the present description describes a system that can generate time to empty values for any of a wide variety of different types of application machines which are applying material to a field. The time to empty values can be used to control the application machine (such as the ground speed, or other operational characteristics of the machine), and/or to control a communication system to communicate information to tender vehicles and/or to generate operator interface control signals to generate a warning or other indicator showing an operator the time to empty of a current application operation. Further, the present description describes a system that can be used to pre-calculate a number of refills on a per-zone or per-field basis (or both), and the time to empty each load after a refill operation, as well as the total time per-zone and per-field to apply material, and a wide variety of other information.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface (UI) displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which the mechanisms are displayed is a touch sensitive screen, the mechanisms can be actuated using touch gestures. Also, where the device that displays them has speech recognition components, the mechanisms can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components, generators, calculators, and/or logic. It will be appreciated that such systems, components, generators, calculators, and/or logic can be comprised of hardware items (such as processors and associated memory, or other processing components, some of which are described below) that perform the functions associated with those systems, components, generators, calculators, and/or logic. In addition, the systems, components, generators, calculators, and/or logic can be comprised of software that is loaded into a memory and is subsequently executed by a processor or server, or other computing component, as described below. The systems, components, generators, calculators, and/or logic can also be comprised of different combinations of hardware, software, firmware, etc., some examples of which are described below. These are only some examples of different structures that can be used to form the systems, components, generators, calculators, and/or logic described above. Other structures can be used as well.

It will also be noted that the information on map 107 can be output to the cloud.

Figure 10:
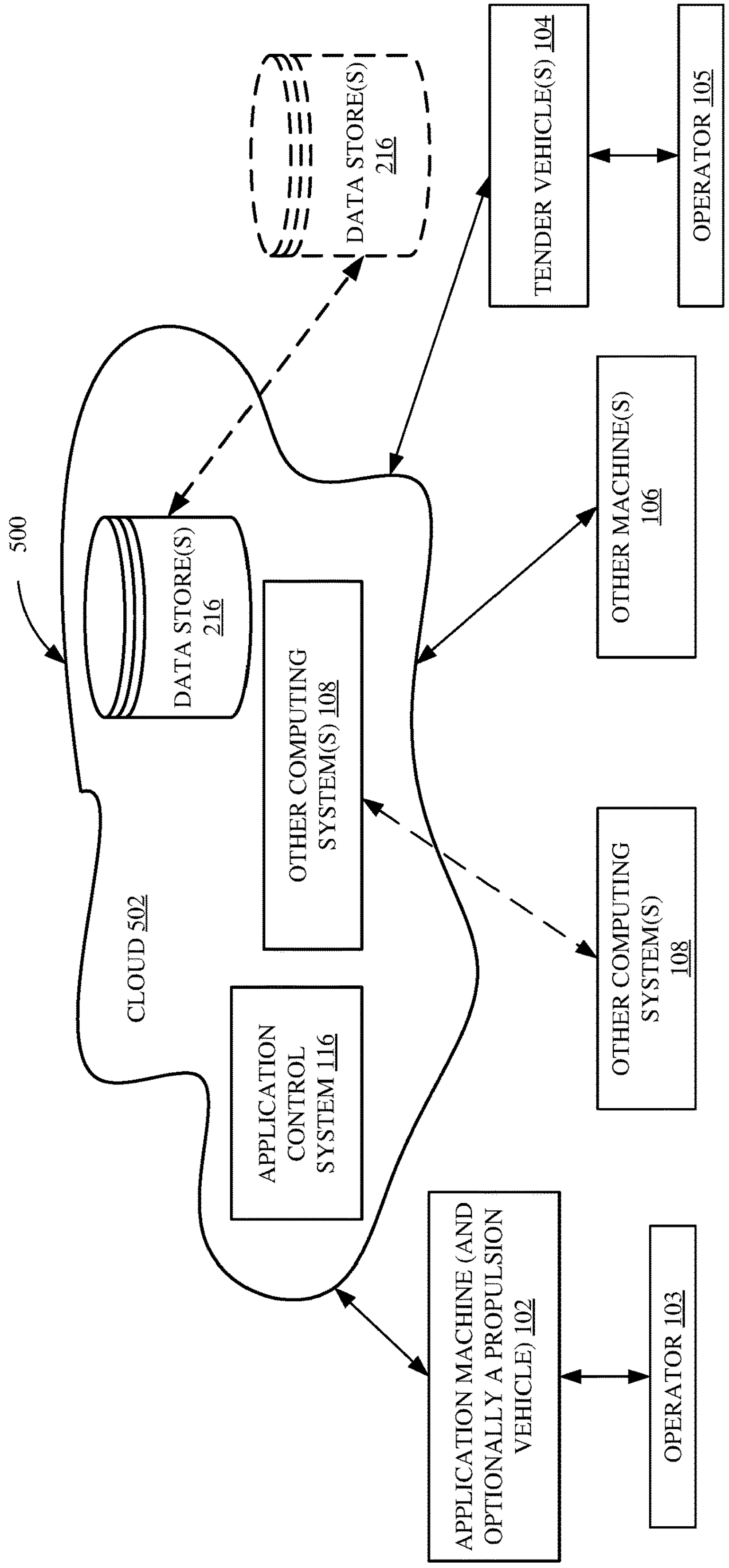
FIG. 10 is a block diagram showing one example of the agricultural system deployed in a remote server environment.

FIG. 10 is a block diagram of machine 102, shown in FIG. 1, except that it communicates with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in previous FIGS. as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 10, some items are similar to those shown in previous FIGS. and they are similarly numbered. FIG. 10 specifically shows that application control system 116, other systems 108, and/or data store 216 can be located at a remote server location 502. Therefore, machine 102 accesses those systems through remote server location 502.

FIG. 10 also depicts another example of a remote server architecture. FIG. 10 shows that it is also contemplated that some elements of previous FIGS are disposed at remote server location 502 while others are not. By way of example, data store 216 can be disposed at a location separate from location 502, and accessed through the remote server at location 502. Regardless of where the items are located, the items can be accessed directly by machine 102, through a network (either a wide area network or a local area network), the items can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the machine 102 comes close to the fuel truck for fueling, the system automatically collects the information from the harvester using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the machine 102 until the machine 102 enters a covered location. The machine 102, itself, can then send the information to the main network.

It will also be noted that the elements of previous FIGS., or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 11:
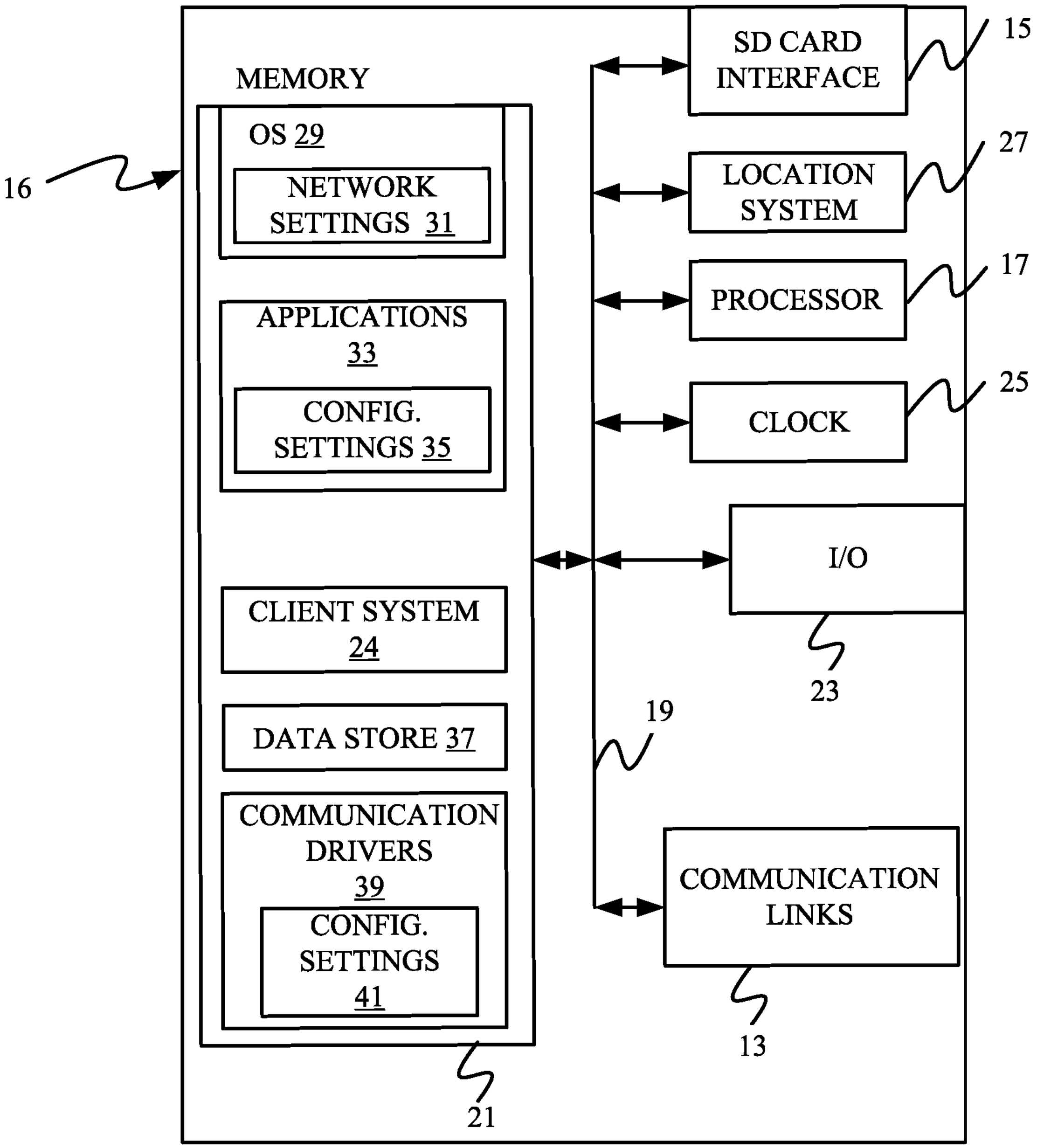
FIGS. 11-13 are block diagrams showing examples of mobile devices.
Figure 12:
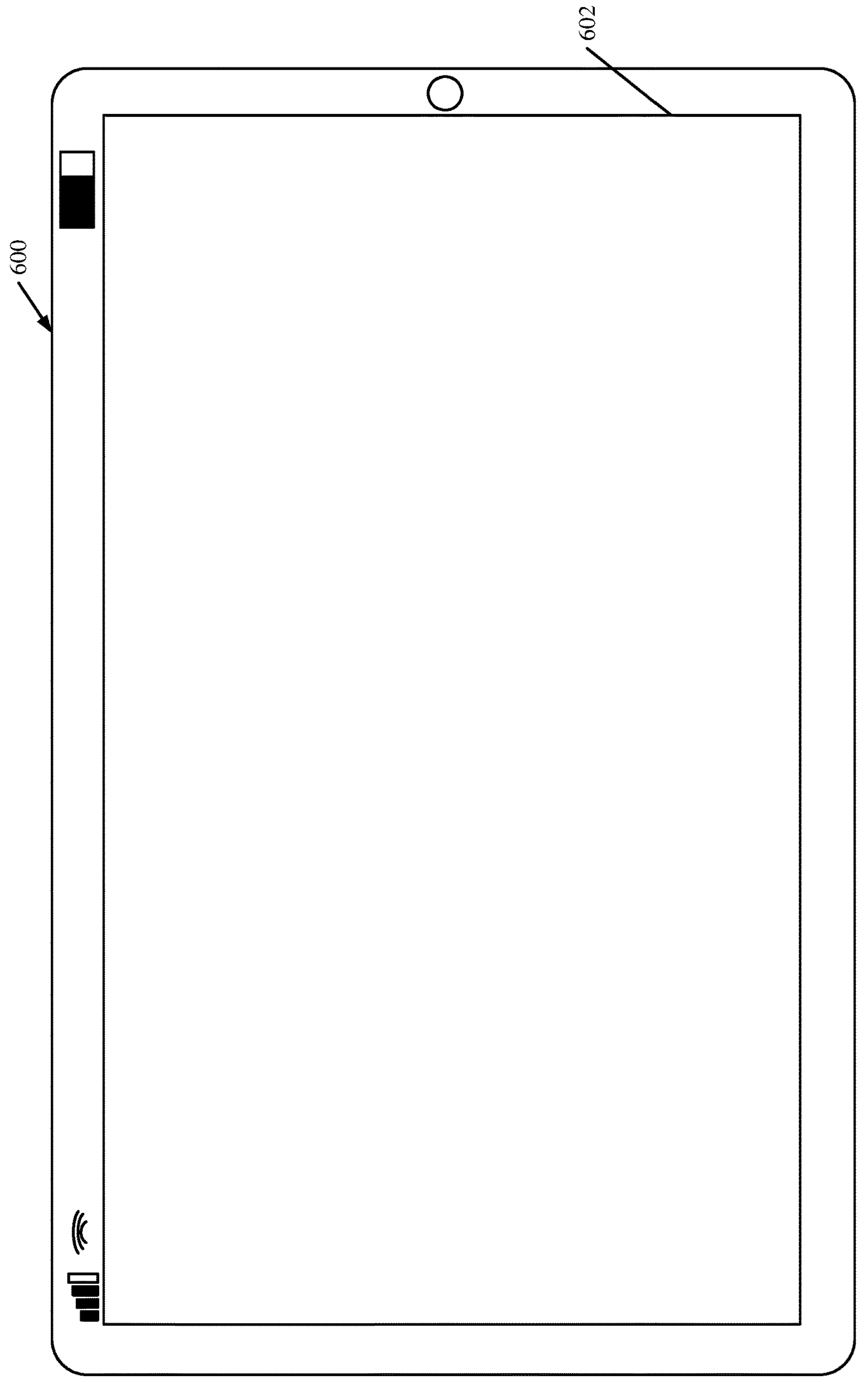
Figure 13:
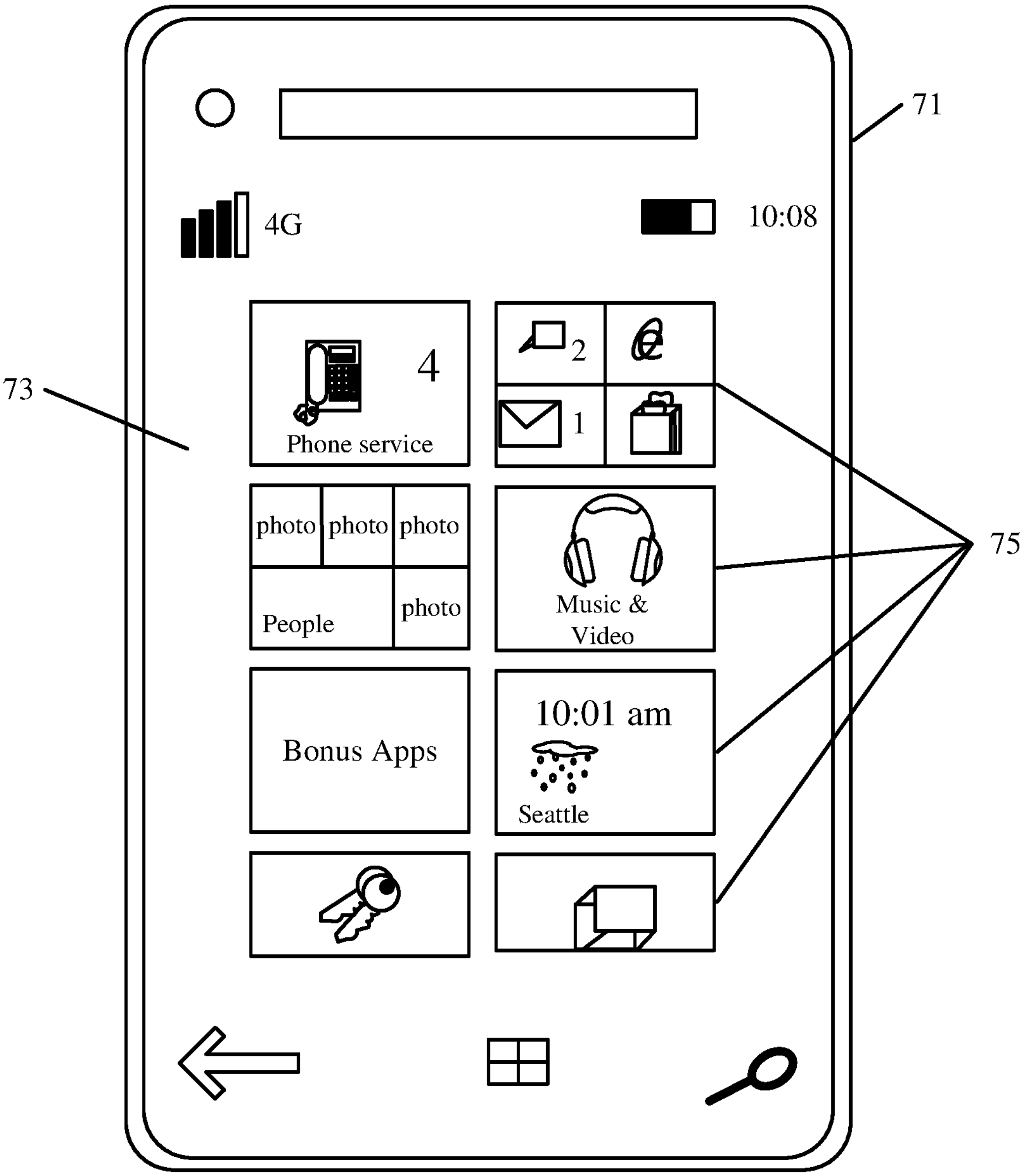

FIG. 11 is a simplified block diagram of one illustrative example of a handheld or mobile computing device that can be used as a user's or client's hand held device 16, in which the present system (or parts of it) can be deployed. For instance, a mobile device can be deployed in the operator compartment of harvester 100 for use in generating, processing, or displaying the stool width and position data. FIGS. 12-13 are examples of handheld or mobile devices.

FIG. 11 provides a general block diagram of the components of a client device 16 that can run some components shown in previous FIGS., that interacts with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. System 27 can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 can also include computer storage media (described below). Memory 21 stores computer readable instructions that, when executed by processor 17, cause the processor to perform computer-implemented steps or functions according to the instructions.

Processor 17 can be activated by other components to facilitate their functionality as well.

FIG. 12 shows one example in which device 16 is a tablet computer 600. In FIG. 12, computer 600 is shown with user interface display screen 602. Screen 602 can be a touch screen or a pen-enabled interface that receives inputs from a pen or stylus. Computer 600 can also use an on-screen virtual keyboard. Of course, computer 600 might also be attached to a keyboard or other user input device through a suitable attachment mechanism, such as a wireless link or USB port, for instance. Computer 600 can also illustratively receive voice inputs as well.

FIG. 13 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 14:
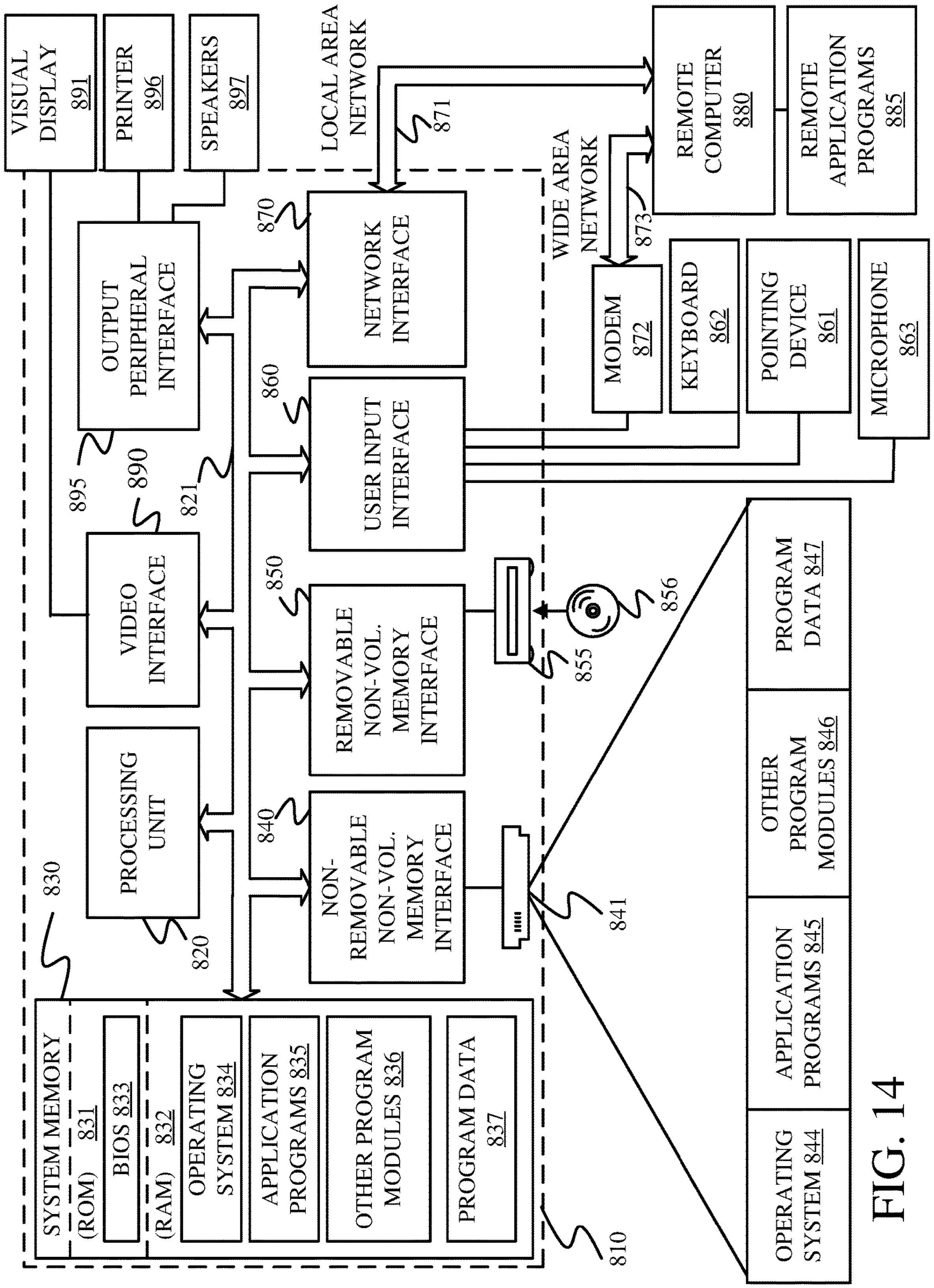
FIG. 14 is a block diagram showing one example of a computing environment that can be used in the architectures and systems shown in previous figures.

FIG. 14 is one example of a computing environment in which elements of previous FIGS., or parts of it, (for example) can be deployed. With reference to FIG. 14, an example system for implementing some embodiments includes a computing device in the form of a computer 810 programmed to operate as described above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to previous FIGS. can be deployed in corresponding portions of FIG. 10.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. Computer storage media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term “modulated data signal” means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 14 illustrates operating system 834, application programs 835, other program modules 836, and program data 837.

The computer 810 may also include other removable/non-removable volatile/nonvolatile computer storage media. By way of example only, FIG. 14 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 14, provide storage of computer readable instructions, data structures, program modules and other data for the computer 810. In FIG. 14, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 14 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:

obtaining a weight value indicative of a weight of material in a material container corresponding to a material application machine that is configured to perform an application operation to apply the material to a field;

obtaining one or more operation characteristics of the application operation;

calculating a mass flow rate value based on the one or more operation characteristics, the mass flow rate value indicative of a mass flow rate of material being applied to the field by the material application machine;

generating, based on the mass flow rate value and the weight value, a time to empty value indicative of time it takes for the material application machine to apply the material to the field to empty the material container;

obtaining a capacity of the material application machine to hold material;

obtaining a map input that divides the field into a plurality of application zones and defines, for each respective application zone, of the plurality of application zones. a size in units of area of the respective application zone; and for each respective application zone of the plurality of application zones, identifying an application rate for the respective application zone; and identifying a number of fill operations for the respective application zone based on the application rate for the respective application zone, the size of the respective application zone, and the capacity of the material application machine; and generating a control signal to control the material application machine based on at least one of the time to empty value or the number of fill operations.

2. The method of claim 1 wherein the one or more operation characteristics comprises at least two operation characteristics, each operation characteristic, of the at least two operation characteristics, comprising a different one of:

a speed at which a conveyance system, that conveys the material on the material application machine, moves a given distance, a density of the material, or a rate at which the material application machine is applying the material to the field.

3. The method of claim 1 wherein calculating the mass flow rate value comprises:

detecting an application speed value indicative of a speed at which a volume of the material is being applied to the field;

obtaining a density value indicative of a density of the material; and calculating the mass flow rate value based on the application speed value and the density value.

4. The method of claim 3 wherein detecting an application speed value comprises:

detecting a speed of movement value indicative of a speed at which a conveyance system, that conveys the material on the material application machine, moves a given distance; and obtaining a correlation value indicative of a volume of material moved by the conveyance system each time the conveyance system moves the given distance, and wherein calculating the mass flow rate value comprises calculating the mass flow rate value based on the speed of movement value, the density value, and the correlation value.

5. The method of claim 4 wherein the conveyance system comprises a rotary system and wherein detecting the speed of movement value comprises:

detecting a speed of the rotary system in revolutions per minute and wherein obtaining the correlation value comprises obtaining a volume per revolution value indicative of a volume of the material that is applied per revolution of the rotary system, and wherein generating the mass flow rate value comprises generating the mass flow rate value based on the speed of the rotary system, the density value, and the volume per revolution value.

6. The method of claim 1 comprising:

obtaining an application rate value indicative of a rate at which the material application machine is applying the material to the field; and obtaining a productivity value indicative of how quickly the material application machine is applying the material to a defined area of the field, and wherein generating the time to empty value comprises generating the time to empty value based on the application rate value and the productivity value.

7. The method of claim 6 wherein obtaining the application rate value comprises obtaining the application rate value in units of weight per unit of area, and wherein obtaining the productivity value comprises obtaining the productivity value in units of area per unit of time.

8. The method of claim 7 wherein obtaining the productivity value comprises:

detecting a ground speed of the material application machine;

obtaining a dimension of the material application machine; and generating the productivity value based on the ground speed and the dimension.

9. The method of claim 1 wherein generating a time to empty value comprises:

generating an instantaneous time to empty value.

10. The method of claim 9 wherein generating a time to empty value comprises:

obtaining an aggregated time by aggregating a plurality of instantaneous time to empty values; and generating a current time to empty value based on the aggregated time to empty values.

11. The method of claim 1 and further comprising:

generating a time to empty value corresponding to each fill operation in each of the plurality of application zones;

generating a zone-based application time value indicative of a time to apply the material to each application zone based on the time to empty values corresponding to the fill operation in each of the plurality of application zones; and generating a field-based time value indictive of a time to apply material to the entire field based on the zone-based application time values.

12. The method of claim 1 wherein generating a control signal comprises at least one of:

generating a speed control signal to control a speed of the material application machine, or generating an operator interface control signal to display a time to empty display on an operator interface mechanism of the material application machine.

13. The method of claim 1 wherein generating a control signal comprises:

generating a communication control signal to communicate a time to empty value to a tender vehicle.

14. An application control system comprising:

at least one processor; and a data store that stores computer executable instructions which, when executed by the at least one processor cause the at least one processor to perform steps comprising:

obtaining a capacity of a material application machine to hold material in a material container corresponding to the material application machine that is configured to perform an application operation to apply the material to a field;

obtaining a map input that divides the field into a plurality of application zones and defines, for each respective application zone, of the plurality of application zones, a size in units of area of the respective application zone; and for each respective application zone of the plurality of application zones, identifying an application rate for the respective application zone, identifying a number of fill operations for the respective application zone based on the application rate for the respective application zone, the size of the respective application zone, and the capacity of the material application machine; and generating a control signal to control the material application machine based on the number of fill operations for the respective application zone.

15. The application control system of claim 14 wherein generating a control signal comprises:

generating an operator interface control signal to display an indication of the number of fill operations for the respective application zone to an operator of the material application machine.

16. The application control system of claim 14, and further comprising:

generating a time to empty value corresponding to each fill operation in each of the plurality of application zones;

generating a zone-based application time value indicative of a time to apply the material to each application zone based on the time to empty values corresponding to the fill operation in each of the plurality of application zones; and generating a field-based time value indictive of a time to apply material to the entire field based on the zone-based application time values.

17. An application machine comprising:

a container that holds material to be applied to a field;

an application mechanism configured to perform an application operation to apply the material from the container to the field;

an operator interface system; and an application control system configured to:

obtain a capacity of a material application machine to hold material in a material container corresponding to the material application machine that is configured to perform an application operation to apply the material to a field;

obtain a map input that divides the field into a plurality of application zones and defines, for each respective application zone, of the plurality of application zones, a size in units of area of the respective application zone; and for each respective application zone of the plurality of application zones, identify an application rate for the respective application zone, identify a number of fill operations for the respective application zone based on the application rate for the respective application zone, the size of the respective application zone, and the capacity of the material application machine; and generate a control signal to control the material application machine based on the number of fill operations for the respective application zone.

18. The application machine of claim 17, wherein the application control system is configured to:

generate an operator interface control signal to display an indication of the number of fill operations for the respective application zone to an operator of the material application machine.

19. The application machine of claim 17, wherein the application control system is configured to:

generate a time to empty value corresponding to each fill operation in each of the plurality of application zones;

generate a zone-based application time value indicative of a time to apply the material to each application zone based on the time to empty values corresponding to the fill operation in each of the plurality of application zones; and generate a field-based time value indictive of a time to apply material to the entire field based on the zone-based application time values.

* * * * *